United States Patent [19]

Ehrhardt

[11] Patent Number: 4,731,161
[45] Date of Patent: Mar. 15, 1988

[54] SEMIBLEACHING LIQUOR FOR KRAFT PAPER PRODUCTS

[75] Inventor: F. Joseph Ehrhardt, Haddonfield, N.J.

[73] Assignee: Union Camp Corporation, Wayne, N.J.

[21] Appl. No.: 891,106

[22] Filed: Jul. 31, 1986

[51] Int. Cl.$^4$ .................. D21C 3/00; D21C 3/02; C01B 15/037
[52] U.S. Cl. ........................... 162/78; 162/90; 252/186.28; 252/186.43
[58] Field of Search .............. 252/186.28, 186.41, 252/186.43; 162/76, 78, 90

[56] References Cited

U.S. PATENT DOCUMENTS

| 3,023,140 | 2/1962 | Textor | 162/78 |
| 3,193,445 | 7/1965 | Parker et al. | 162/78 |
| 4,120,747 | 10/1978 | Sarge, III et al. | 162/25 |
| 4,222,819 | 9/1980 | Fossum et al. | 162/76 |
| 4,599,138 | 7/1986 | Lindahl | 162/19 |

OTHER PUBLICATIONS

Kutney, G., 70th Annual CPPA Meeting, 1984 p. B175.

Primary Examiner—John F. Terapane
Assistant Examiner—Virginia B. Caress
Attorney, Agent, or Firm—Edward J. Sites

[57] ABSTRACT

A process of preparing a bleaching liquor with an improved stability involves mixing of magnesium ions and hydrogen peroxide prior to the addition of sodium hydroxide. The liquor may be used to bleach Kraft wood pulps, obtaining higher brightness levels.

6 Claims, No Drawings

SEMIBLEACHING LIQUOR FOR KRAFT PAPER PRODUCTS

BACKGROUND OF THE INVENTION

1. Field of the Invention

The invention relates to wood pulp bleaching liquors and their use in bleaching wood pulps.

2. Brief Description of the Prior Art

Hydrogen peroxide has long been used as an effective bleaching agent for paper products. It has found considerable use in the manufacture of bleached mechanical pulps. Hydrogen peroxide has also found some use in the final stages of a multiple stage bleaching sequence for chemical pulps as a method of inhibiting brightness reversion. There has been a small amount of work done with hydrogen peroxides as a semibleaching agent for chemical pulps; see for example Dugal, H. S., Ruhanen, M., 1981 TAPPI Environmental Conference, p. 93 and Lachenal, D., de Choudens, C., Soria, L., Monzie, P., 1982 International Pulp Bleaching Conference, p. 145. In all cases there has been little work completed on the effects of bleach liquor makeup in hydrogen peroxide bleaching.

Hydrogen peroxide bleaching is generally performed under alkaline conditions where it is most susceptible to decomposition. It is common practice to pretreat pulp furnishes with a chelating agent, such as diethylenetriaminepentaacetic acid (DTPA), to inhibit the decomposition. The chelating agent serves to tie up metal ions such as manganese, iron and copper which can catalyze the peroxide decomposition reaction. In addition, sodium silicate and magnesium sulfate are often used in the peroxide bleach liquor to stabilize the peroxide. When using hydrogen peroxide on chemical pulps, sodium silicate often does not provide the benefit that it does on mechanical pulps. Although the benefits of using sodium silicate and magnesium sulfate are widely recognized the mechanism of the benefit is not fully understood.

Very little work has been done investigating the effect that bleach liquor preparation may have on the bleaching process. The most extensive work has been completed by Burton (71st Annual CPPA Meeting (1985), p. A131)) where a wide variety of preparation procedures were examined. Burton also stated that the generally held belief is that a cascading system, for peroxide bleaching liquor preparation, is the best method for mixing peroxide bleach chemicals. The recommended order of addition in the cascading system (for mechanical pulps) was: magnesium sulfate, sodium silicate, caustic and lastly hydrogen peroxide.

We have found that if the bleach chemicals are mixed together in the following order:

$MgSO_4$: $H_2O_2$: and lastly NaOH a significant increase in peroxide residual and final brightness is evidenced over the commonly recommended procedure of adding the peroxide last. We do not know what the beneficial mechanism is, but it may relate to a formation of magnesium/peroxide complex which would be inhibited if caustic is mixed with the magnesium prior to addition of peroxide.

Although the above-described procedure has not been recognized as providing a benefit in the literature or patents, Kutney (70th Annual CPPA Meeting (1984), p. B175) tested 75 stabilizing compounds including magnesium chloride (as a magnesium source) when bleaching groundwood or mechanical pulps. His experimental procedure indicates a mixing order of:

$MgCl_2$: $H_2O_2$: NaOH with additions of 0.22% and 0.49% magnesium. We typically use less magnesium. Kutney did not give any reason or benefit for using this mixing order and stated that magnesium does not have a beneficial effect on the bleaching process carried out by him. Additionally, he used it on groundwood or mechanical pulps whereas our advantage for its use is for a Kraft pulp.

Pero, R. W. and Dence, C. W., J. Wood Chem. Tech. 3(2): 195(1983) describe a procedure which may incorporate the same mechanism but is not the same process. They suggest steeping pulp in a suitable stabilization system, then adding peroxide and finally adjusting the pH with caustic. This is a multistep process whereas we are preparing a bleach liquor in a single step process.

The U.S. Pat. No. 3,023,140 describes a system for refiner semibleaching. In one example, peroxide and magnesium sulfate are mixed prior to caustic addition. However, this mixture is added to the refiner prior to adding caustic. This method also incorporates sodium silicate and is a sequential addition rather than a bleach liquor makeup. No comments as to the benefits of a particular chemical mixing order were made.

SUMMARY OF THE INVENTION

The invention comprises a method of preparing a stable bleaching liquor, which comprises:

providing an aqueous solution containing 0.05 to 2.0 percent by weight of hydrogen peroxide and 0.005 to 0.2 weight percent magnesium ion from a water-soluble magnesium salt; and adding to the provided solution 0.05 to 2.0 weight percent of an alkali metal hydroxide, preferably 0.05 to 1.0 weight percent.

The invention also comprises the bleaching liquor product of the process of the invention.

The invention also comprises the use of the bleaching liquor of the invention to semibleach a Kraft pulp which has been pretreated with DTPA. Using a specific mixing order (1. dilution water, 2. magnesium sulfate, 3. hydrogen peroxide, 4. sodium hydroxide) when making up the peroxide bleach liquor effects enhanced peroxide stabilization and higher brightness of the end product than when an alternative mixing order is used.

The term "stable bleaching liquor" as used herein meas an alkaline peroxide solution in which the rate of decomposition of the peroxide is lowered and which is not detrimental to the cellulosic material to be bleached.

DETAILED DESCRIPTION OF THE PREFERRED EMBODIMENTS OF THE INVENTION

It is the order in which the bleaching chemicals are mixed that enhances the stabilization of the hydrogen peroxide. We believe that association of magnesium ion and hydrogen peroxide prior to sodium hydroxide addition is the important factor.

The semi-bleaching liquor of the invention may be made by simple admixture of the specified ingredients, in the specified proportions, employing conventional mixing techniques and apparatus. The liquor of the invention may then be used in a conventional manner and in conventional bleaching apparatus to semi-bleach Kraft pulps.

The pulps bleached may be preliminarily cleaned or treated according to usual known practices. The pulp may be diluted with water and pretreated with diethylenetriaminepentaacetic acid (DTPA) as a chelating agent to inhibit decomposition. The chelating agent serves to tie up metallic ions such as manganese, iron, and copper which can catalyze the peroxide decomposition reaction. The liquor is added to the pulp and heated to a temperature of circa 60° C.-100° C. for 5 to 120 minutes. Afterwards the pulp is usually neutralized to a pH of about 5 to about 6.

The bleaching liquor of the invention may be employed in a bleaching proportion, i.e.; in a proportion of from about 0.5 to about 4.0 percent by weight of hydrogen peroxide on the pulp to be bleached.

Stabilizing the hydrogen peroxide is necessary to assure the effective and efficient use of the peroxide. Excessive decomposition is not only wasteful, but it results in poor bleaching and may damage the pulp.

The following examples describe the manner and the process of making and using the invention and set forth the best mode contemplated by the inventor for carrying out the invention but are not to be construed as limiting.

EXAMPLE 1

A. Two 50 gram (dry weight) batches of a 75% 17 Kappa hardwood and 25% 50 Kappa pine furnish (145 grams at 34.5% consistency) were treated with a mixture of:

0.1 grams DTPA (20 mls of 5 gpl solution);
3.7 grams black liquor solids (91.6 mls of 40 gpl solution); and
994 mls deionized water to achieve a consistency of 4%.

The pulp, black liquor solids and half the dilution water were mixed in a polyethylene bleach bag. The remainder of the dilution water and the DTPA were added to the bleach bag but separated from the pulp. The bleach bag was sealed and the system preheated in a water bath at 60° C. After 0.5 hours, the pulp was mixed with the DTPA and the mixture put back in the water bath for 15 minutes. After the 15 minute pretreatment the furnish was removed from the bleach bag and filtered to 20% consistency. The pulp was not washed. This pulp was divided into samples 1 thru 4.

B. Peroxide bleach liquor solutions were prepared by mixing in a 250 ml beaker:

16.1 mls deionized water;
0.01 g magnesium ion (1.0 mls of 49.8 gpl magnesium sulfate);
0.3 g hydrogen peroxide (6.2 mls of 48.4 gpl hydrogen peroxide); and
0.2 g sodium hydroxide (10 mls of 20 gpl sodium hydroxide).

For samples 1 and 2 the chemicals were added to the beaker in the following order:
water, magnesium, sodium hydroxide, peroxide.

For samples 3 and 4 the chemicals were added to the beaker in the following order:
water, magnesium, peroxide, sodium hydroxide.

C. Each solution of Part B. above was added to 10 grams (dry weight) of the pretreated pulp of Part A., above in a polyethylene bleach bag. The mixtures were then steeped in a 90° C. water bath for 45 minutes. After steeping, the bleach liquor was analyzed for final pH and peroxide residual. The furnish was neutralized to pH 5 to 6 with sulfuric acid. The GE brightness and luminous reflectance were determined. The results are in the Table I below.

TABLE I

| | SAMPLE NO. | | | |
|---|---|---|---|---|
| | 1 | 2 | 3 | 4 |
| final pH | 10.8 | 10.7 | 10.2 | 10.1 |
| residual $H_2O_2$* | 0 | 0 | 20.0 | 25.3 |
| GE Brightness | 41.9 | 41.5 | 50.8 | 50.6 |
| Luminous Reflectance | 60.2 | 59.3 | 69.5 | 69.3 |

*As a percentage of the original addition.

From the above example it is noted that when caustic was the last component added to the bleach liquor solution an additional eight points of brightness was attained. The high final pH and zero peroxide residual in the solution of Samples 1 and 2 indicate that the peroxide had not been sufficiently stabilized.

EXAMPLE 2

A pulp as described in Part A. of Example 1 was pretreated as in Example 1 supra. except that the black liquor solids were not used in the pretreatment stage. Pulps of samples 5 and 6 were well washed after the pretreatment. Pulps of samples 7 and 8 were not washed but were pressed to 20% consistency after the pretreatment. The pulps were then bleached as noted in Part C. of Example 1 supra. During the preparation of the bleach liquor, according to Part B. of Example 1, NaOH was added last to the liquor for samples 5 and 7. Hydrogen peroxide was added last to the liquor for samples 6 and 8. The results are given in Table II below. These results indicate that the mixing order had an effect even when the process had no black liquor solids present.

TABLE II

| | SAMPLE NO. | | | |
|---|---|---|---|---|
| | 5 | 6 | 7 | 8 |
| final pH | 10.8 | 11.0 | 10.7 | 11.0 |
| residual $H_2O_2$* | 9.3 | 1.7 | 6.7 | 0.5 |
| GE Brightness | 48.8 | 44.3 | 46.2 | 41.9 |
| Luminous Reflectance | 66.9 | 62.5 | 64.6 | 59.6 |

*As a percentage of the original addition.

What is claimed is:

1. A method of preparing a stabilized bleaching liquor which comprises:
    providing an aqueous solution consisting essentially of 0.005 to 0.2 weight percent of a water soluble magnesium salt and 0.05 to 2 weight percent of hydrogen peroxide; and
    then adding to said solution 0.05 to 2.0 weight percent of an alkali metal hydroxide.

2. The method according to claim 1 wherein said magnesium salt is magnesium sulfate.

3. The method according to claim 1 wherein said alkali metal hydroxide is sodium hydroxide.

4. The bleaching composition prepared by the method of claim 1.

5. In a method of semibleaching a Kraft pulp, which comprises heating the pulp in the presence of a liquor comprising an alkaline solution of hydrogen peroxide and a magnesium salt, the improvement which comprises employing as said liquor the bleaching composition of claim 4.

6. The method of claim 5 wherein the pulp is pretreated with diethylenetriaminepentaacetic acid.

* * * * *